Feb. 18, 1958     B. L. HAVENS ET AL     2,823,586
BOMB RELEASE COMPUTING SYSTEM
Filed Oct. 3, 1945
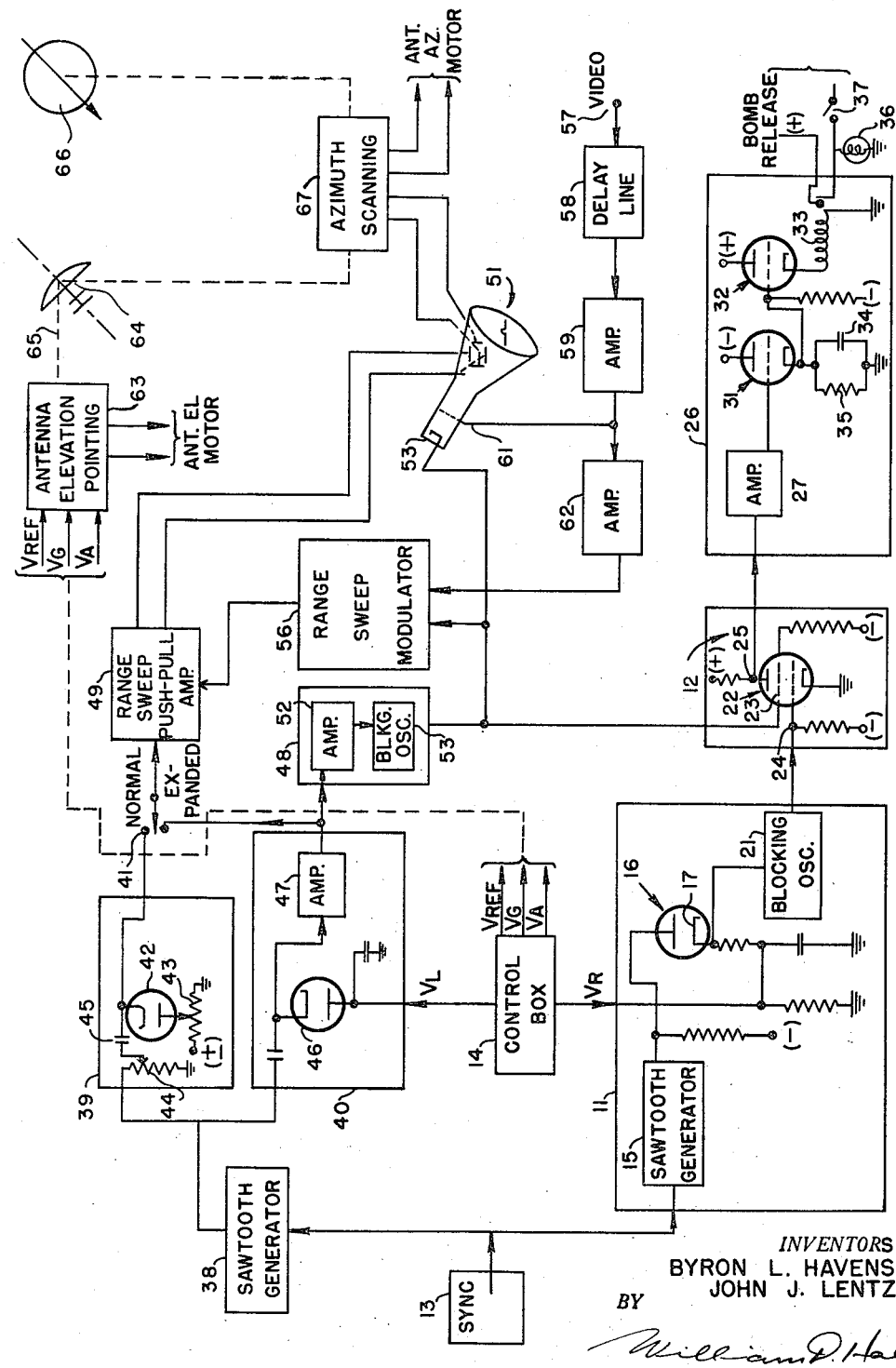
INVENTORS
BYRON L. HAVENS
JOHN J. LENTZ
BY
*William D. Hall,*
ATTORNEY United States Patent Office 2,823,586
Patented Feb. 18, 1958

2,823,586

BOMB RELEASE COMPUTING SYSTEM

Byron L. Havens and John J. Lentz, Cambridge, Mass., assignors, by mesne assignments, to the United States of America as represented by the Secretary of War Application October 3, 1945, Serial No. 620,134

4 Claims. (Cl. 89—1.5)

This invention relates to radio object-locating equipment and more particularly to auxiliary equipment to be used in conjunction with radio object-locating equipment for low altitude bombing of surface or ground targets.

In the bombing of surface vessels or ground targets from an aircraft flying at a relatively low altitude, say 5000 feet, it is desirable to be able to compute in advance the correct bomb release point and make provisions for automatically releasing or automatically indicating the time of release of the bombs.

In such systems used heretofore it has been the practice to make the assumption that the slant range was equal to the ground range in calculation of bombing points. Furthermore, such systems relied upon the operator's skill in maintaining coincidence between a controllable pip and the target echo. The antenna normally used on the associated radio object-locating equipment is normally of the cosecant squared ($csc^2$) type and as such is insensitive to antenna elevation. However, azimuth resolution is not uniform at all elevation angles, and in some cases it is desirable to be able to point the antenna in elevation in such a manner as to operate with optimum azimuth resolution.

A type of bombing which is normally done in low altitude bombing, and especially in the bombing of moving surface craft, is done by flying a so-called collision course. It is possible to prove that if one of two moving objects moves in such a manner that the true bearing of the second object as seen from the first remains unchanged, the two objects will arrive at the same point at the same time. In such a case the first object is said to follow a collision course.

It is an object of the present invention, therefore, to provide an electrical system for automatically releasing bombs from an aircraft in accordance with the coincident occurrence of an electrically calculated and generated release pip and an electrically generated tracking pip which is itself coincident with the target echo. This system also has provision for indicating coincidence between target echo and a tracking pip, for automatically pointing the antenna in elevation and for presenting azimuthally stable indication in the cathode ray tube, thus greatly aiding in the flying of a collision course.

For a better understanding of the invention, together with other and further objects thereof, reference is had to the following description taken in connection with the accompanying drawing in which there is shown in block and diagrammatic form the preferred embodiment of the present invention.

The present invention is designed for use with a radio object-locating system, and constant reference will be had to signals, synchronizing voltages, and so forth which form a part of every such system.

Referring now to the drawing, there is shown schematically the present invention which comprises generally two channels, the upper portion of the drawing shown being generally concerned with the tracking pip circuits and the lower portion being generally concerned with the bomb release circuits. A release pip generator 11 is designed to provide an output pip to a coincidence circuit 12 at a time after a synchronizing signal is received from a "sync" source 13. The time interval is proportional to a voltage $V_R$ from a control box 14 which voltage is in turn proportional to the slant range which has been calculated as the correct slant range for releasing a bomb to strike a designated target. The "sync" source 13 will normally be a part of the radio object-locating system heretofore mentioned. The pip generator 11 may be any conventional type such as a delay multivibrator. Such a delay multivibrator is disclosed in the copending application of Stanley N. Van Voorhis, Serial No. 594,258, filed May 17, 1945. However, in the preferred embodiment of the present invention the pip generator 11 comprises a sawtooth generator 15, the output of which passes through a clamper or biased diode represented generally by 16. The cathode 17 of the diode is held at a potential of $V_R$ by the aforementioned voltage from control box 14. When the sawtooth output of generator 15 exceeds $V_R$, a signal is passed to a blocking oscillator 21 which produces a pip output to the coincidence circuit 12. Sawtooth generators and blocking oscillators are well known in the art, an example of the former being shown in Figs. 4–25, page 186 of "Ultra High Frequency Techniques" by J. C. Brainerd, G. Koehler, et al., D. Van Nostrand, Inc., 1942, and an example of the latter being shown in Fig. 34A, page 314, of "Radio Engineer's Handbook" by F. E. Terman, McGraw Hill, 1943. The coincidence circuit 12 may be any type circuit which produces an output only upon the coincident application of two signals thereto. In the preferred embodiment of the present invention a multi-grid amplifier tube 22 is used with the input signals being applied to separate grids 23 and 24. The grids 23 and 24 are respectively biased in such a manner that a signal on either one will not cause the tube to conduct, but conduction occurs only when both grids 23 and 24 coincidently receive signals at which time a signal will be present at the plate 25 of tube 22. The control box 14 provides five voltage outputs, $V_R$, $V_L$, $V_{REF}$, $V_A$ and $V_G$, the uses of which will become apparent from the present discussion. The control box 14 is more fully described and claimed in the copending application of Byron L. Havens and John J. Lentz, Serial No. 620,135, filed October 3, 1945, now Patent No. 2,693,315, patented November 2, 1954. The second input to the coincidence circuit 12 is a tracking pip which corresponds at all times in range or in time with the returned echo from the selected target. The manner of generation and of maintaining in synchronism with the target echo will be described in greater detail in a latter part of this specification. The output of the coincidence circuit 12 is fed to a bomb release circuit 26. The circuit 26 may be any circuit capable of operating a relay upon reception of a signal or group of signals. In the preferred embodiment of this invention circuit 26 comprises one or more amplifiers 27, for raising the signal level, which feed a memory circuit denoted generally by 31. The memory circuit 31 connects to an amplifier 32 which operates a relay 33. The circuit 31 is essentially a cathode follower stage but having a capacitor 34 in parallel with the normal cathode resistor 35. The time constant of the capacitor 34 and resistor 35 in parallel with the effective resistance of the tube 31 is such that the voltage across capacitor 34 will not build up sufficiently high to cause conduction of amplifier 32, which is normally maintained in a nonconducting state, unless a predetermined successive number of signals are received. This prevents the release of bombs on extraneously produced coincidence. The relay 33 may control other relays or circuits which actually release the bombs.

Associated with the relay 33, in such a manner as to be energized when the relay 33 is actuated, is an indicator 36 which may be a pilot light. A switch 37 is preferably inserted in the circuit of the relay 33 in such a manner that release of bombs may be prevented at any time by the operator.

An alternate method of operation is, of course, open, it being completely possible to have a separate bomb release circuit which could be operated by some member of the crew on the aircraft when the indicator 36 indicates coincidence and time of release of the bomb.

The upper portion of the system of this invention will now be described. A sawtooth generator 38 is synchronized by the "sync" source 13 and produces an output voltage having substantially a sawtooth waveform. The output of generator 38 is connected to level setting circuits 39 and 40, the outputs of which are respectively connected to terminals marked "normal" and "expanded" of a single-pole double-throw switch 41. The sawtooth generator 38 may be of a type similar to generator 15 or any other type well known in the art. The level setting circuits 39 and 40 may be any type of circuits well known in the art which are capable of clamping or otherwise maintaining the grid of a tube at a predetermined potential in the absence of an input signal. In the preferred embodiment of this invention circuit 39 comprises a vacuum tube diode 42 having its cathode connected to the "normal" terminal of switch 41 and its plate connected to a tap on a potentiometer 43. The potentiometer 43 is connected between a suitable source of potential and ground. The output from generator 38 is connected to a potentiometer 44 a tap of which is electrically connected by means of a capacitor 45 to the cathode of tube 42. In the preferred embodiment of the present invention the level setting circuit 40 comprises a biased diode 46 the bias of which is controlled by a voltage $V_L$ which is supplied by the control box 14 and which is proportional to the instantaneous slant range from the aircraft to the selected target. The diode 46 is arranged to maintain the bias on a cathode follower amplifier 47 at a value determined by the voltage $V_L$. The output of the cathode follower 47 is fed to the terminal, marked "expanded," of switch 41 and to a tracking pip generator 48. The common terminal of switch 41 connects to a range sweep push-pull amplifier 49, the output of which is suitably connected to the vertical deflection electrodes of a cathode ray tube 51. Although the cathode ray tube 51 is shown employing electrostatic deflection, it is to be understood that magnetic deflection may also be used. The amplifier 49 may be any conventional type well known in the art; for example, it may be similar to the circuit of Figs. 5–15, page 223, of "Ultra High Frequency Techniques," by J. G. Brainerd, G. Koehler, et al., D. Van Nostrand, Inc., in 1942. The tracking pip generator 48 may be any type of circuit well known in the art capable of providing an output pip or pulse. The preferred circuit for generator 48 comprises an amplifier 52 which is so biased that it is maintained cutoff until such time as the signal on the control grid thereof passes through zero. At the time of conduction of amplifier 52, which time is determined by the D.-C. level set by level-setting circuit 40, a signal is impressed upon the control grid of a blocking oscillator 53. The blocking oscillator 53 may be similar to the oscillator 21. The output of generator 48 or oscillator 53 is electrically connected to the grid 23 of the amplifier tube 22 in the coincidence circuit 12. The output of generator 48 is also connected to the cathode 55 of cathode ray tube 51 for illuminating the screen thereof at the time of occurrence of the tracking pip from generator 48 and is further connected to a range sweep modulator circuit 56. The range sweep modulator 56 is connected to the range sweep amplifier 49 and modulates the starting level for each succeeding sweep to produce on the cathode ray tube 51 indication of coincidence between the tracking pip and the returned signal from a designated target. The range sweep modulator 56 is more fully described and claimed at the copending application by Byron L. Havens and Robert M. Walker, Serial No. 620,133, filed October 3, 1945, now Patent No. 2,671,182, patented March 2, 1954.

It is to be understood that although it is preferred to use the range sweep modulator 56 to aid in the indication of coincidence of the target echo and the tracking pip and in indicating the azimuthal position of the selected target this circuit may be eliminated entirely or replaced by other circuits as may be desired.

The returned signals or echoes are provided to the system by the associated radio object-locating apparatus at the input 57 designated "video." The video signals are passed through a delay line 58 to an amplifier 59. The purpose of the delay line 58 is to permit the range sweep on the cathode ray tube 51 to start before signals are applied. This permits presentation of all the data, some of which might otherwise be lost or obscured. The output of amplifier 59 is connected to an intensity grid 61 of the cathode ray tube 51 for illuminating the screen thereof at the time of occurrence of received signals. The output of amplifier 59 is also connected to an amplifier 62, the output of which is connected to range sweep modulator 56.

An antenna elevation pointing circuit 63 positions the antenna 64 in elevation so that it points directly toward the target in accordance with intelligence derived from the present position of antenna 64 provided by mechanical connection 65 and voltages $V_G$ and $V_A$ proportional respectively to ground range and altitude together with a reference voltage $V_{REF}$ which voltages are supplied by control box 14. The antenna elevation pointing system is more fully described and claimed in the copending application of Kenneth E. Schriener, Serial No. 620,136, filed October 3, 1945, now Patent No. 2,678,438, patented May 11, 1954.

It is to be understood that although the use of the antenna elevation pointing circuit 63 is preferred, the difficulties encountered in its addition may not warrant its use, and, therefore, the present invention is not to be limited to systems employing antenna-pointing circuits.

A stable reference 66, such as a gyro which is movable in azimuth, is mechanically connected to an azimuth scanning circuit 67. The azimuthal position of the antenna 64 is also mechanically connected to azimuth scanning circuit 67. The azimuth scanning circuit 67 provides sector scanning of approximately 30° about the position of the reference 66. An output of circuit 67 also provides azimuth sweep for the cathode ray tube 51. The azimuth scanning circuit is more fully described and claimed in the copending application of John J. Lentz, Serial No. 616,379, filed September 14, 1945, now Patent No. 2,724,113, patented November 15, 1955.

In the operation of the present system the switch 37 is normally open, and the switch 41 will be initially in the "normal" position. The sweep generator 38 will produce a sawtooth voltage which is amplified by amplifier 49 and applied to the cathode ray tube 51 to produce a normally vertical sweep of the electron beam. The starting point of this sweep is determined by the setting of potentiometer 43 and its physical length by the setting of potentiometer 44. The period of time required for one sweep will generally represent about 10 miles with zero range visible near the lower edge of the screen. At the same time the sawtooth voltage output of generator 38 actuates tracking pip generator 48 to provide an output pip which is applied to the cathode 55 of cathode ray tube 51. The time of occurrence of this pip is determined by $V_L$ and may be adjusted by a potentiometer setting on control box 14. Meanwhile azimuth scanning circuit 67 is causing the antenna 64 to search through approximately 30° in space and is providing azimuth scan for the cathode ray tube 51. The azimuth scan provided by the circuit of the cited copending application is approximately sinusoidal in nature. This causes a crowding near the edges of the screen of tube 51 with a relatively expanded azimuth scale near the center of the screen. By this means a target may be more accurately centered on the screen of tube 51. Signals returned from targets within the 30-degree search sector will be portrayed on the screen of tube 51 and the sector scanned may be chosen by altering the azimuthal position of the stable reference 66. When the desired target is observed, the stable reference 66 is moved until the target appears in the center of the screen of tube 51 and the horizontal line formed by the tracking pip is moved to intersect the target indication by variation of $V_L$ from control box 14. During the preceding operation the range sweep modulator 56 will normally be inactive. Also during or prior to the above target selecting operation the proper value of altitude is "set in" on control box 14. Other data which will have been previously "set in" on the control box 14 include time of fall of the bomb and trail of the bomb. As hereinbefore stated, a more complete discussion of the control box is found in the copending application of Byron L. Havens and John J. Lentz, Serial No. 620,135, filed October 3, 1945, now Patent No. 2,693,315, patented November 2, 1954.

After the preliminary adjustments have been made, the target echo located in the center of screen of tube 51 and the line formed by the tracking pip is caused to approximately pass through the target echo, the switch 41 is set in the "expanded" position. The amplifier 52 is so biased that the tracking pip from oscillator 53 will occur in the center of the screen of the tube 51. The range sweep modulator 56 is now assumed to be operating as it may in fact be controlled by a switch, not shown, which is mechanically connected to switch 41. Final adjustments are now made in $V_L$ from the control box 14 to cause coincidence between the tracking pip and the selected target echo. This coincidence, due to the effect of the range sweep modulator 56, will be indicated by a break in the line formed by the tracking pip on the screen of tube 51. The resulting indication on the tube 51 will be somewhat as shown on the face of tube 51 with the position of coincidence indication indicating the true azimuth to the target. A closing speed potentiometer in the control box 14 is now adjusted in such a manner that coincidence is maintained. An auxiliary indicator, not shown, is normally employed to indicate to the pilot of the aircraft the azimuth position of the target relative to the stable reference so that he may fly the aircraft in such a direction that the azimuth to the target does not change. It is to be noted that it is the azimuth of the target relative to the stable reference 66 that does not change and not necessarily the azimuth relative to the aircraft. If the pilot flies such a source as described, he flies what has been previously called a collision course.

The preliminary settings on the control box 14 which have been hereinbefore described will properly adjust $V_R$ to the correct value and a release pip generated by pip generator 11 will be applied to the coincidence circuit 12. When the aircraft has reached the proper position relative to the target, the tracking pip, which has been maintained in coincidence with the target echo, will coincide with the release pip, thus passing a signal to the bomb release circuit 26 wherein relay 33 will be actuated and the bomb released. Indicator 36 will indicate this event.

It will be apparent to one skilled in the art that certain additional refinements will be necessary for initial calibration of the system. Such additions may include clampers, potentiometers, attenuators, etc. For example, some circuit refinements may be necessary to permit adjustment of zero range when the system is operating on the "normal" setting of switch 42 and to permit adjustment the length of the sweep. These refinements are recognized, but since such expedients are well known in the art, they have been omitted from the present specification for simplicity.

While there has been described what is at present considered the preferred embodiment of the invention, it will be obvious to those skilled in the art that various changes and modifications may be made therein without departing from the invention.

What is claimed is:

1. A bomb release point computing system for producing an electrical signal to operate a bomb release mechanism comprising first pulsing means to produce first periodic pulses the times of occurrence of which a function of the slant range at which the bombs are desired to be released, second pulsing means adjustable to produce second periodic pulses the times of occurrence of which are a function of the actual slant range, third means for producing third periodic pulses the times of occurrence of which are a function of the target distance, means for indicating coincidence between said second and third pulses, coincidence circuit means coupled to said first and second pulsing means to provide a periodic pulse output only upon coincidence of said first and second periodic pulses, a cathode follower circuit connected to said coincidence circuit means to receive the output pulses therefrom, a memory circuit comprising a parallel capacitor-resistor circuit connected in the cathode circuit of said cathode follower, the time constant of said capacitor-resistor circuit being somewhat longer than the repetition rate of said periodic pulses, and relay means connected to said memory circuit for operating a bomb release relay only upon a voltage build-up on said memory circuit by the reception of a plurality of successive pulses from said coincidence circuit means whereby spurious operation of said bomb release relay is prevented.

2. A bomb release point computing system for producing an electrical signal to operate a bomb release mechanism comprising: first pulsing means to produce first periodic pulses the times of occurrence of which are a function of the slant range at which bombs are to be released, second pulsing means adjustable to produce second periodic pulses the times of occurrence of which are a function of the actual slant range of a target, a cathode ray oscilloscope having two mutually perpendicular deflecting means and screen illuminating means, an antenna supported for movement in azimuth and elevation, elevation pointing means for positioning the antenna in elevation so that the antenna points toward the target, stable reference means adjustable to azimuthally position said antenna, azimuth scanning means coupled to said reference means to scan said antenna about the azimuth position, means coupling said azimuth scanning means to one of said deflecting means for providing a sweep voltage in synchronism with the antenna scan, sweep means connected to the other deflecting means, third pulsing means to produce third periodic pulses the times of occurrence of which are a function of the target distance, means connecting said second and third pulsing means to said sweep means whereby coincidence between said second and third periodic pulses may be noted, coincidence circuit means coupled to said first and second pulsing means to provide a periodic pulse output only upon coincidence of said first and second periodic pulses, a cathode follower circuit coupled to said coincidence circuit means to receive the pulses therefrom, a momery circuit comprising a parallel capacitor-resistor circuit connected in the cathode circuit of said cathode follower, the time constant of said capacitor-resistor circuit being somewhat longer than the repetition rate of said periodic pulses, relay means connected to said memory circuit for operating a bomb release relay only upon a voltage build-up on said memory circuit by the reception of a plurality of successive pulse coincidently with the operation of said transmitter: ious operation of said bomb release relay is prevented.

3. A bomb release point computing system for producing an electrical signal to operate a bomb release mechanism comprising, in combination with a radar system including an antenna supported for movement in azimuth and elevation, a transmitter and a receiver coupled through a duplexing means to said antenna, and a synchronizing signal generator operable to generate a pulse coincidently with the operation of said transmitter; control means operable to provide a first signal of variable magnitude and variable rate of change of magnitude, and a second signal proportional in magnitude to the correct slant range for bomb release; first pulsing means coupled to said synchronizing signal generator and to said control means to provide a first chain of periodic pulses, the times of occurrence of which with respect to said synchronizing pulse are determined by said first signal; second pulsing means coupled to said synchronizing signal generator and to said control means to provide a second chain of periodic pulses, the times of occurrence of which are a function of said second signal; a cathode ray oscilloscope having two mutually perpendicular deflecting means and screen illuminating means; stable reference means adjustable to azimuthally position said antenna; azimuth scanning means coupled to said reference means to scan said antenna about the azimuth position; means connecting said azimuth scanning means to one of said deflecting means for providing a sweep voltage in synchronism with the antenna scan; sweep means connected to the other deflecting means; third pulsing means connected to said radar receiver to provide a third chain of periodic pulses, the times of occurrence of which are a function of the target distance; means connecting said first and third pulsing means to said screen illuminating means, whereby coincidence between said first and second pulse chains may be noted; means connected to said sweep means to provide a normal or an expanded sweep centered about the coincident indication of said first and third pulse chains; sweep modulator means coupled to said first and third pulsing means and to said sweep means to vary the starting level of said sweep means in accordance with the amplitude of the pulses from said third pulsing means when said first and third pulse chains coincide; coincidence circuit means coupled to said first and second pulsing means to provide a chain of periodic pulses when said first and second pulse chains coincide; a cathode follower circuit connected to said coincidence circuit means to receive the periodic pulses therefrom; a memory circuit comprising a parallel capacitor-resistor circuit connected in the cathode circuit of said cathode follower, the time constant of said capacitor-resistor circuit being somewhat longer than the repetition rate of said periodic pulses; and relay means connected to said memory circuit for operating a bomb release relay only upon a voltage build-up on said memory circuit by the reception of a plurality of successive pulses form said coincidence circuit means whereby spurious operation of said bomb release relay is prevented.

4. The bomb release point computing system of claim 3 wherein said control means further provides third and fourth signals, respectively proportional to target ground distance and aircraft altitude, and a reference signal; antenna elevation pointing means coupled to said antenna and connected to receive said third and fourth signals and said reference signal, whereby said antenna is pointed in elevation toward the target.

References Cited in the file of this patent

UNITED STATES PATENTS

| | | |
|---|---|---|
| 2,194,141 | Estoppey | Mar. 19, 1940 |
| 2,371,606 | Chaffee | Mar. 20, 1945 |
| 2,433,284 | Luck | Dec. 23, 1947 |
| 2,433,843 | Hammond et al. | Jan. 6, 1948 |
| 2,444,678 | Sanders | July 6, 1948 |
| 2,445,584 | Ramo | July 20, 1948 |
| 2,453,996 | Ludwig | Nov. 16, 1948 |
| 2,480,208 | Alvarez | Aug. 30, 1949 |
| 2,488,448 | Townes et al. | Nov. 15, 1949 |
| 2,600,428 | Pooler et al. | June 17, 1952 |
| 2,733,436 | Doba et al. | Jan. 31, 1956 |

UNITED STATES PATENT OFFICE
CERTIFICATE OF CORRECTION

Patent No. 2,823,586                                    February 18, 1958

Byron L. Havens, et al

It is hereby certified that error appears in the printed specification of the above numbered patent requiring correction and that the said Letters Patent should read as corrected below.

Column 6, line 12, after "which" insert -- are --; line 64, for "momery" read -- memory --; line 72, for "pulse coincidently with the operation of said transmitter:" read -- pulses from said coincidence circuit means whereby spur- --; column 8, line 14, for "form" read -- from --.

Signed and sealed this 22nd day of March 1960.

(SEAL)
Attest:

KARL H. AXLINE
Attesting Officer

ROBERT C. WATSON
Commissioner of Patents